Figure 4:
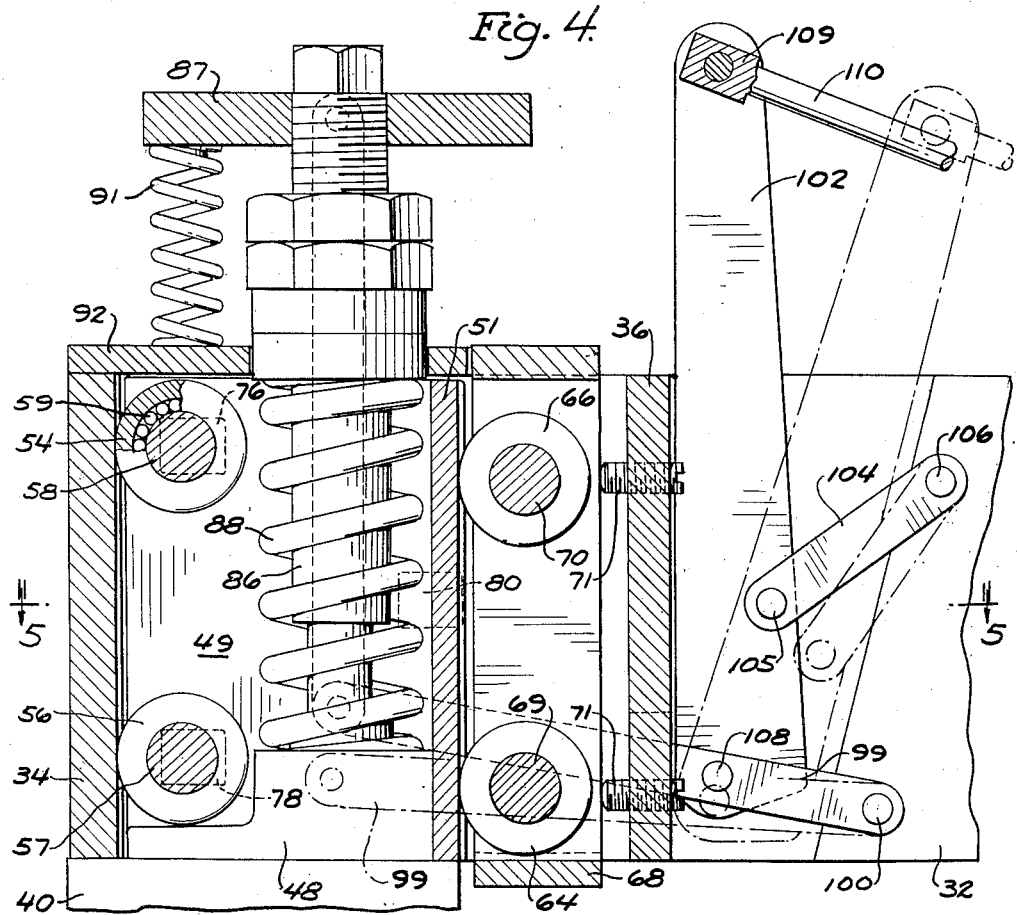

Dec. 27, 1949  P. E. BRUNBERG  2,492,551
RESISTANCE WELDING
Filed Aug. 31, 1948.  2 Sheets-Sheet 1
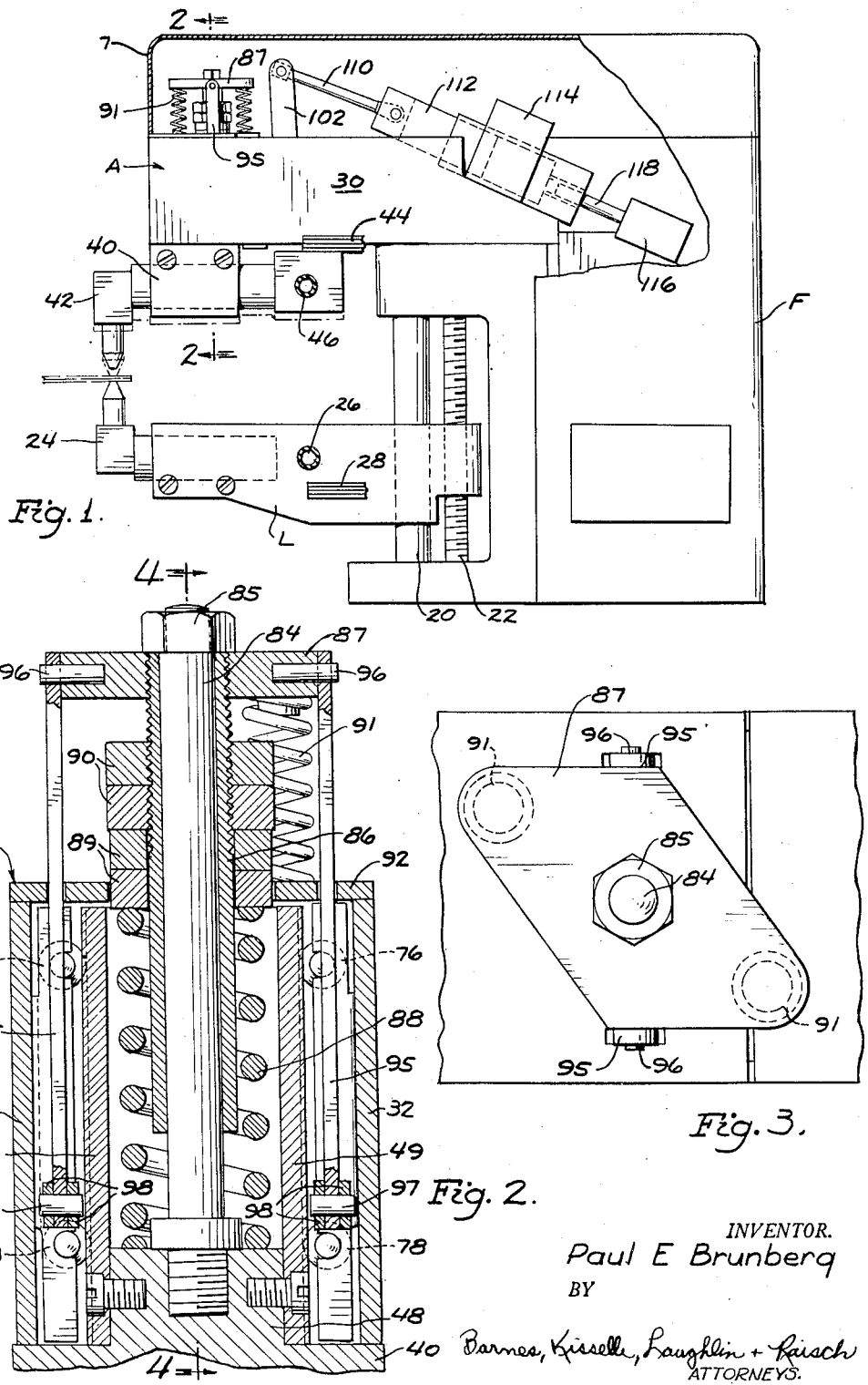
INVENTOR.
Paul E Brunberg
BY
Barnes, Kisselle, Laughlin + Raisch
ATTORNEYS.

Dec. 27, 1949 P. E. BRUNBERG 2,492,551
RESISTANCE WELDING
Filed Aug. 31, 1948 2 Sheets-Sheet 2

INVENTOR.
Paul E. Brunberg
BY
Barnes, Kisselle, Laughlin + Raisch
ATTORNEYS.

Patented Dec. 27, 1949

2,492,551

UNITED STATES PATENT OFFICE 2,492,551

RESISTANCE WELDING

Paul E. Brunberg, Detroit, Mich.

Application August 31, 1948, Serial No. 47,018

5 Claims. (Cl. 219—4)

1

This invention relates to resistance welding and has particularly to do with a spot welding machine.

It is an object of the present invention to provide an improved welding construction which in its mechanical features provides a very low resistance to follow-through action on the part of the welding heads which clamp the metal. It is known that when two pieces of metal are clamped between welding electrodes and a current of electricity is passed therethrough, there is a sudden rise in the temperature of the metal to the point that it becomes plastic.

One of the features of the present invention is the ability of the welding machine and clamping mechanism to adapt itself to this plastic condition of the metal to prevent arcing and to insure a positive interfusion of the two pieces being joined. Because of the very short interval of time involved in the operation, it is essential that the follow-through motion be almost instantaneous.

It is an object of the present invention to provide a construction which adapts itself particularly to this follow-through motion both in the principle of operation and in the fundamental design.

It is another object of the invention to provide a welding machine which is entirely electrical in its operation as distinguished from those machines which require hydraulic or pneumatic control in addition to the electrical current for the resistance weld.

An additional object of the invention is the provision of a very simple mechanical device for the application of clamping force in a manner which is consistent with and adaptable to the particular follow-through motion above described as desirable.

The importance of the immediate follow-through action has become critical in recent years because of the newer metals and alloys which have been adapted to production manufacturing uses. These new metals and alloys have a plastic range which is relatively narrow and it is imperative that the follow-through action of the welding equipment be instantaneous with the softening or fusioning point of the metal created by the resistance between the electrodes.

Another important result of this immediate follow-through motion has been the reduction of arcing and flash and a consequent savings in welding tips and cleaner welds.

Other objects and features of the invention relating to details of construction and operation

2 will become evident in the following description and claims.

Drawings accompany the specification and the various views thereof may be briefly described as:

Figure 1, a general elevation of the machine in assembly showing the relative position of the various parts.

Figure 2, a vertical section on line 2—2 of Figure 1 showing the details of the upper moving head of the welder.

Figure 3, a plan view of the mechanism illustrated in Figure 2.

Figure 4, a vertical section on line 4—4 of Figure 2.

Figure 5:
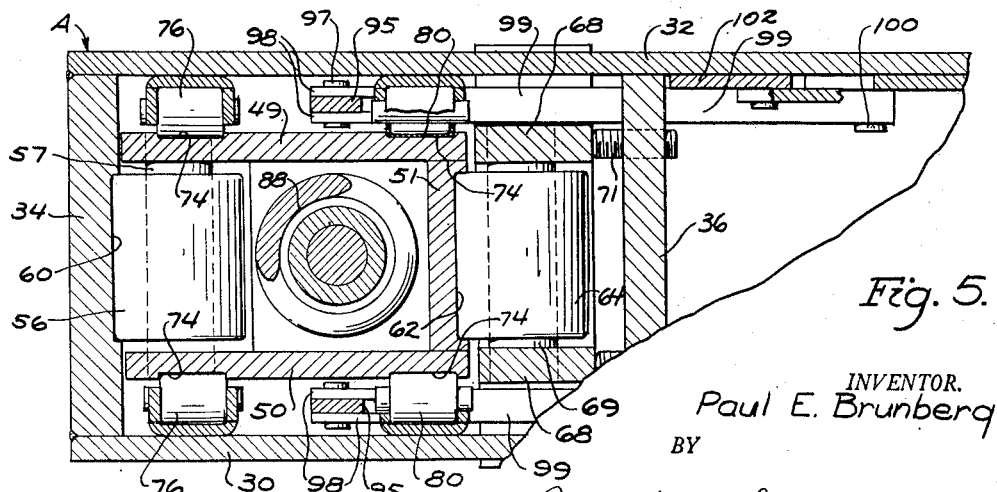

Figure 5, a horizontal section on line 5—5 of Figure 4.

Referring to the drawings, it will be seen that in Figure 1 a welding machine is shown having a frame F on which is mounted a lower electrode arm L. This electrode arm is slidable on a vertical guide 20 and adjustable on this guide by a threaded shaft 22. The lower arm L has an electrode recess in which is mounted a standard electrode 24 which receives cooling water through a tube 26. A transformer, not shown, is mounted in the frame F and has a secondary terminal illustrated diagrammatically at 28 connected to the lower arm L. The upper arm of the electrode, indicated generally at A, is rigidly attached to the frame F. The main elements of the arm are two side plates 30 and 32 which extend away from the frame F and which are bridged at the end by a plate 34 (Figs. 4 and 5). Parallel to the plate 34 and spaced inwardly of the ends of the arms 30 and 32 is a plate 36 rigidly fastened between the arms to complete a box-like chamber at the forward end of the arm. A top electrode holder 40, mounted in a manner to be described in detail later, holds an electrode 42 (Fig. 1) to which is connected the other end 44 of the secondary of the transformer and in which there is a water conduit 46 for cooling purposes.

The upper electrode holder 40 is movably mounted in the arm A and the welding pressure is applied by the movement of this holder. Rising up from a reduced projection 48 on electrode holder 40 is a channel-shaped post having sides 49 and 50 and a back 51 fastened to the projection 48. Between the sides 49 and 50 at the forward edges are mounted two rollers 54 and 56 on pins 58 and 57, needle bearings 59 being interposed between the rollers and the pins. These rollers 54 and 56 should be of the highest quality available and they are so positioned that they project just slightly beyond the forward edges of the side plates 49 and 50 to cooperate with a channel 60 in the rear face of the cross panel 34. The rear face of the back 51 also has a bearing channel 62 formed therein to cooperate with roller bearings 64 and 66 mounted in an adjustable slide 68 on pins 69 and 70. Set screws 71 in cross plate 36 are available to adjust the position of the slide 68 on the side members 30—32.

In the side walls 49 and 50 of the channel post are longitudinal bearing grooves or races 74 arranged to cooperate with needle bearing rollers 76 at the top forward portion of the channel, rollers 78 at the lower forward portion of the channel, and rollers 80 at the central rear portion of the channel.

The rollers 76, 78 and 80 are all mounted on the side walls of the arm A; that is, the sides 30 and 32 respectively. There is thus a three-point roller contact on the sides 49 and 50 of the channel post. It will thus be seen that the channel post is mounted for free vertical shifting between the sides of arm A.

The relative movement between the electrode holder 40 and the arm A is controlled through a stud 84 which is threaded into the projection 48 and which has a threaded upper end for retaining a nut 85. Mounted around the stud 84 is a sliding sleeve 86 which is threaded into a horizontal force plate 87 lying below the nut 85 and having a parallelogram shape as shown particularly in Figure 3.

A relatively heavy spring 88 surrounds the stud 84 and the sleeve 86 bearing at one end on the projection 48. At the top end are two retaining washers 89 held in place by retaining nuts 90 threaded on the outside of sleeve 86. Downward force on plate 87 compresses spring 88 which applies its force to the electrode holder 40. Springs 91 serve as return springs for the force plate 87 and these springs bear on a top plate 92 bridging the side plates 30—32.

The force application plate 87 has depending from the sides thereof two links 95 pivoted at 96 to the edges of the plate. The lower ends of these links 95 are pivoted at 97 to the clevis end 98 of links 99 which in turn are anchored by a pivotal connection 100 to the side plates 30 and 32 of arm A. The links 95 and 99 form the force supplying links of a toggle motion which is completed by bars 102 pivoted at their lower ends at 108 to the links 99 and extending upwardly to a point above the arm A. The arms 102 are connected by links 104 pivoted between points 105 on bar 102 and 106 on plates 30 and 32 of arm A (Fig. 4).

It will be evident that a rearward motion of arms 102 as viewed particularly in Figs. 1 and 4, will swing the point 105 on a downwardly moving arc and thus exert a downward movement at the point 108 on link 99. This downward motion is transmitted to the depending links 95 which apply the force to the plate 87 which transmits it through the sleeve 86 to the spring 88 through which it is applied to the electrode holder 40. The actuating force for arms 102 is applied through a connector 109 and a rod 110 extending from a solenoid plunger 112 of a solenoid 114 mounted in arm A. The solenoid 114 may be of standard construction. A return motion kicking the toggle over center may be applied by a solenoid 116 which can drive a plunger 118 against the retracted solenoid plunger 112. As previously stated, the return springs 91 will function to elevate the force application plate 87.

It will be also evident that when the rod applying force is exerted through the action of solenoid 114 to the channel post made up of members 49, 50 and 51, the post will be free to slide within the confines of the bearings which surround it. There will be a constant application of force to the electrodes by reason of the large spring 88 which may be adjustable to apply any desired amount of force on the work parts. As soon as the voltage is applied to the electrodes to render the metal therebetween in a semi-plastic or molten state, the spring 88 will complete an immediate follow-through of motion thereby preventing any arcing and thereby resulting in a positive welding motion subsequent to the initial clamping movement.

It will be seen that the means for applying energy to the movable arm is entirely independent of this follow-through motion and there is, therefore, no inertia drag on the channel post of the electrode holder.

What I claim is:

1. An electrode mount for a spot welder comprising a relatively frictionless guide means to permit a translatory movement of said electrode, spring means positioned to exert force on said electrode, a toggle means for loading said spring in overcenter position, solenoid means for moving said toggle means to overcenter position and additional solenoid means for moving said toggle out of overcenter position.

2. An electrode mount for a spot welder electrode comprising a welder arm provided with a transverse guide recess having opposed parallel walls, an electrode holder, a channel shaped extension on said holder arranged for translatory movement in said recess, roller bearings across the open side of said channel projecting to contact one wall of said recess, roller bearings at one side of said recess to contact the back of said channel member, and three roller bearings at each side of said channel to contact the channel at three triangularly spaced points, and a means for exerting force resiliently on said mount to clamp work and force weld as current is applied to the electrodes.

3. An electrode mount for a spot welder electrode comprising a welder arm provided with a transverse guide recess having opposed parallel walls, an electrode holder, a channel shaped extension on said holder arranged for translatory movement in said recess, roller bearings across the open side of said channel projecting to contact one wall of said recess, roller bearings at one side of said recess to contact the back of said channel member, and three roller bearings at each side of said channel to contact the channel at three triangularly spaced points, a coil spring within said channel bearing at one end on said electrode holder, force application means comprising a plate bearing on the other end of said spring, and means to exert a defined compression of said spring whereby the spring force is transmitted to said holder.

4. An electrode mount for a spot welder electrode comprising a welder arm provided with a transverse guide recess having opposed parallel walls, an electrode holder, a channel shaped extension on said holder arranged for translatory movement in said recess, roller bearings across the open side of said channel projecting to contact one wall of said recess, roller bearings at one side of said recess to contact the back of said channel member, and three roller bearings at each side of said channel to contact the channel at three triangularly spaced points, a coil spring within said channel bearing at one end on said electrode holder, force application means comprising a plate bearing on the other end of said spring, and means to exert a defined compression of said spring whereby the spring force is transmitted to said holder, said means comprising a solenoid actuated toggle linkage.

5. In a resistance welding machine having spaced welding electrodes between which work is clamped for welding purposes, means for movably mounting one of the electrodes comprising a mounting block, bearings contacting said block for movement of the block along the axis of the electrode, a coil spring aligned with the electrode and bearing at one end on said block, a second actuator block bearing on the other end of said spring, over-center toggle means for shifting said actuator block against the action of said spring, a solenoid for actuating said toggle to over-center position, and a second solenoid for releasing said toggle from over-center position whereby all parts return to start position.

PAUL E. BRUNBERG.

REFERENCES CITED

The following references are of record in the file of this patent:

UNITED STATES PATENTS

| Number | Name | Date |
|---|---|---|
| 1,174,446 | Rietzel | Mar. 7, 1916 |
| 1,252,148 | Murray et al. | Jan. 1, 1918 |
| 1,769,148 | Lunn | July 1, 1930 |
| 1,847,890 | Osborne | Mar. 1, 1932 |
| 1,861,005 | Gibb | May 31, 1932 |
| 2,310,556 | Strong | Feb. 9, 1943 |
| 2,313,941 | Humphrey et al. | Mar. 16, 1943 |